(No Model.)
E. E. ROBBINS.
CAN OPENER.
No. 588,243. Patented Aug. 17, 1897.
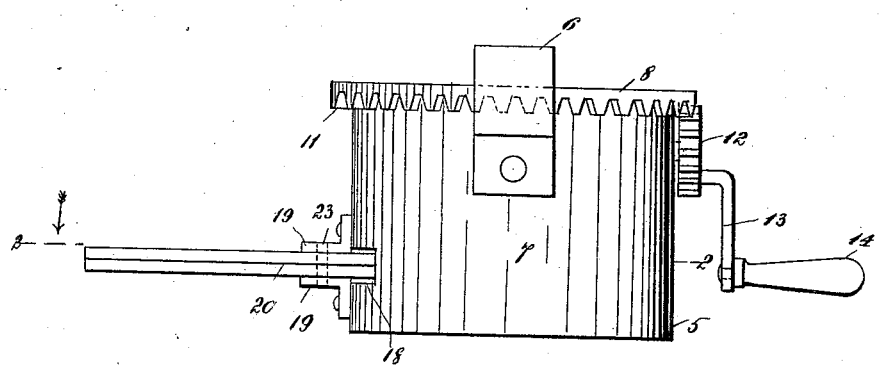
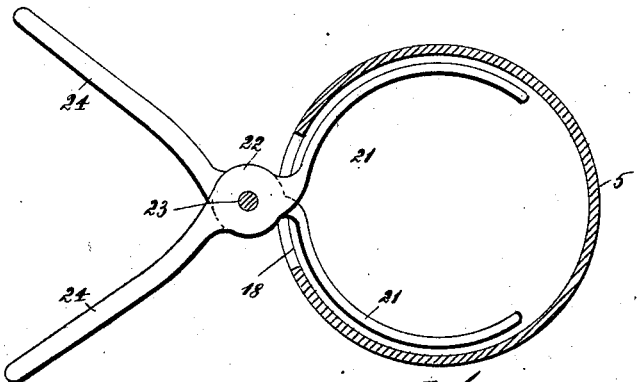
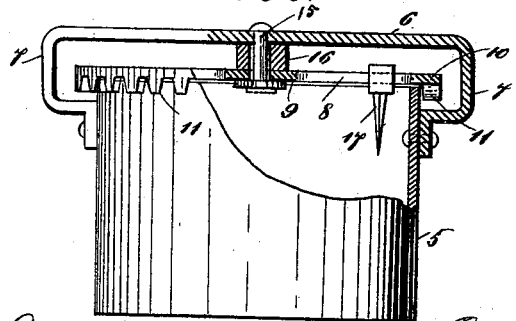
WITNESSES
John Buckler
C Gerst
INVENTOR
Edward E. Robbins
BY
Edgar Tate & Co
ATTORNEYS.

UNITED STATES PATENT OFFICE.

EDWARD EVERETT ROBBINS, OF COLDWATER, KANSAS.

CAN-OPENER.

SPECIFICATION forming part of Letters Patent No. 588,243, dated August 17, 1897.

Application filed January 8, 1897. Serial No. 618,501. (No model.)

*To all whom it may concern:*

Be it known that I, EDWARD EVERETT ROBBINS, a citizen of the United States, residing at Coldwater, in the county of Comanche and State of Kansas, have invented certain new and useful Improvements in Can-Openers, of which the following is a full and complete specification, such as will enable those skilled in the art to which it appertains to make and use the same.

This invention relates to can-openers; and the object thereof is to provide an improved device of this class which is simple in construction and operation and by means of which the entire head of a can may be quickly and easily cut out.

The invention is fully disclosed in the following specification, of which the accompanying drawings form a part, in which—

Figure 1 is a side view of my improved can-opener; Fig. 2, a section on the line 2 2 of Fig. 1, and Fig. 3 a sectional side view at right angles to that of Fig. 1 with part of the operating mechanism removed.

In the drawings forming part of this specification the separate parts of my improvement are designated by the same numerals of reference, and in the practice of my invention I provide a cylindrical casing 5, which is open at both ends and which is large enough to receive an ordinary quart-can.

The casing 5 is provided at the back thereof with a transverse plate or bar 6, which is secured thereto by depending end pieces 7, as clearly shown in Figs. 1 and 3, and mounted on the top of the casing 5 is a wheel 8, which is of greater diameter than said casing and provided with a central hub 9 and the rim 10 of which is provided with downwardly-directed gear-teeth 11.

Mounted to turn on a stud at one side of the cylindrical casing 5 is a pinion 12, which is adapted to operate in connection with the gear-teeth 11 on the rim of the wheel 8, and secured to said pinion is a crank 13, which is provided with a handle 14.

The wheel 8 is retained in position by a bolt 15, which passes through the central hub 9 thereof and through the cross plate or bar 6, and between the hub of said wheel and said cross plate or bar is a sleeve 16, these features of construction being best shown in Fig. 3, and adjustably mounted on one of the spokes of the wheel 8, within the casing 6, is a downwardly-directed blade or cutter 17.

Formed in one side of the cylindrical casing 5 and near the bottom thereof is a transverse slot or opening 18, and secured to the outer side of said casing above and below said slot or opening are two outwardly-directed jaws 19, between which is pivoted a pair of clamps 20.

The clamps 20 consist of two semicircular or segmental jaws 21, each of which is provided with a circular head 22, through which is passed a pivot-pin 23, which is also passed through the jaws 19, that are secured to the casing, and each of said jaws 21 of the clamp is also provided with an arm or handle 24.

The operation will be readily understood from the foregoing description when taken in connection with the accompanying drawings and the following statement thereof.

When the jaws of the clamp 20 are in the open position, as shown in Fig. 2, a can may be inserted into the bottom of the casing 5 and between said jaws or clamps, and by grasping the handles or arms 24 said jaws or clamps may be caused to securely grasp and hold the can. Before the jaws or clamps 21 are caused to grasp and hold the can, as described, the casing 5, the plate or bar 6, and the wheel 8 are depressed, so that the blade or cutter 17 passes through the head of the can adjacent to one side thereof, and then by turning the crank 13 the wheel 8 will be revolved and the head of the can will be cut out by the blade or cutter 17, as will be readily understood.

This device is simple in construction and operation and well adapted to accomplish the result for which it is intended, and it will be evident that the same may be made of any desired size, so as to cut out the head of cans of different diameters.

Having fully described my invention, I claim as new and desire to secure by Letters Patent—

1. The herein-described can-opener, comprising a cylindrical casing, a cross plate or bar mounted thereover, and secured thereto, a wheel connected with said plate or bar by a bolt or pin, which passes through the hub thereof, and through said plate or bar, said wheel being greater in diameter than said casing, and being provided at its perimeter with downwardly-directed gear-teeth, a pinion mounted at the side of the casing, and adapted to operate in connection with said gear-teeth, means for operating said pinion, and a clamp mounted in one side of the casing and provided with jaws which project thereinto, and are adapted to grasp and hold a can, and said wheel being provided with a downwardly-directed blade or cutter, substantially as shown and described.

2. The herein-described can-opener, comprising a cylindrical casing, a cross plate or bar mounted thereover, and secured thereto, a wheel connected with said plate or bar by a bolt or pin, which passes through the hub thereof, and through said plate or bar, said wheel being greater in diameter than said casing, and being provided at its perimeter with downwardly-directed gear-teeth, a pinion mounted at the side of the casing, and adapted to operate in connection with said gear-teeth, means for operating said pinion, and a clamp mounted in one side of the casing and provided with jaws which project thereinto, and are adapted to grasp and hold a can, and said wheel being provided with a downwardly-directed blade or cutter, and the jaws of the clamp being provided with outwardly-directed arms or handles, substantially as shown and described.

In testimony that I claim the foregoing as my invention I have signed my name, in presence of the subscribing witnesses, this 26th day of December, 1896.

EDWARD EVERETT ROBBINS.

Witnesses:
H. I. BURR,
J. M. GRIFFITH.